March 4, 1930.  C. A. NORMAN  1,749,297
PROCESS OF AND APPARATUS FOR TESTING BELTS
Filed Jan. 21, 1929   2 Sheets-Sheet 2

Inventor
Carl A. Norman,
By Emery, Booth, Janney & Varney
Attorney

Patented Mar. 4, 1930

1,749,297

UNITED STATES PATENT OFFICE

CARL A. NORMAN, OF COLUMBUS, OHIO

PROCESS OF AND APPARATUS FOR TESTING BELTS

Application filed January 21, 1929. Serial No. 333,935.

This invention relates to testing power transmitting belts, particularly such as are used for driving parts of machinery, but it is applicable to all kinds of belts, both large and small. The invention aims to determine in a short time and with a minimum use of power the useful life of a belt under controlled conditions of operation, as compared with similar belts.

The method and apparatus forming the subject matter of this application are designed to meet the important practical needs of comparative belt testing for capacity and endurance when subjected to the usual service conditions in a convenient and satisfactory way.

The object of my invention is not only to reproduce actual service conditions as nearly as possible, but also to provide for running the belt under test at all usual speeds with a measurable tension difference corresponding to the power transmitted, and with a measurable slip or creep, and to provide for overloading and for excess speed such as to hasten the failure of belts being tested to destruction.

One way of carrying out the method consists in the running of two belts in parallel on pulleys of slightly different diameters, as shown in the accompanying drawing, so that one drive tends to impart a lower speed to the driven shaft than the other. In consequence the first belt acts as a brake on the second and there is established an enforced slip of amount determined by the pulley diameters. In other words, one belt transmits power from the power driven shaft to the second shaft and the other belt returns the same power to the first shaft, minus the drive losses. No power is taken off the second shaft, otherwise.

The drive tending to impart the higher speed to the driven shaft has its tight side on the usual pulling side of the drive, the drive tending to impart the lower speed has its tight side on the opposite side.

Figure 1:
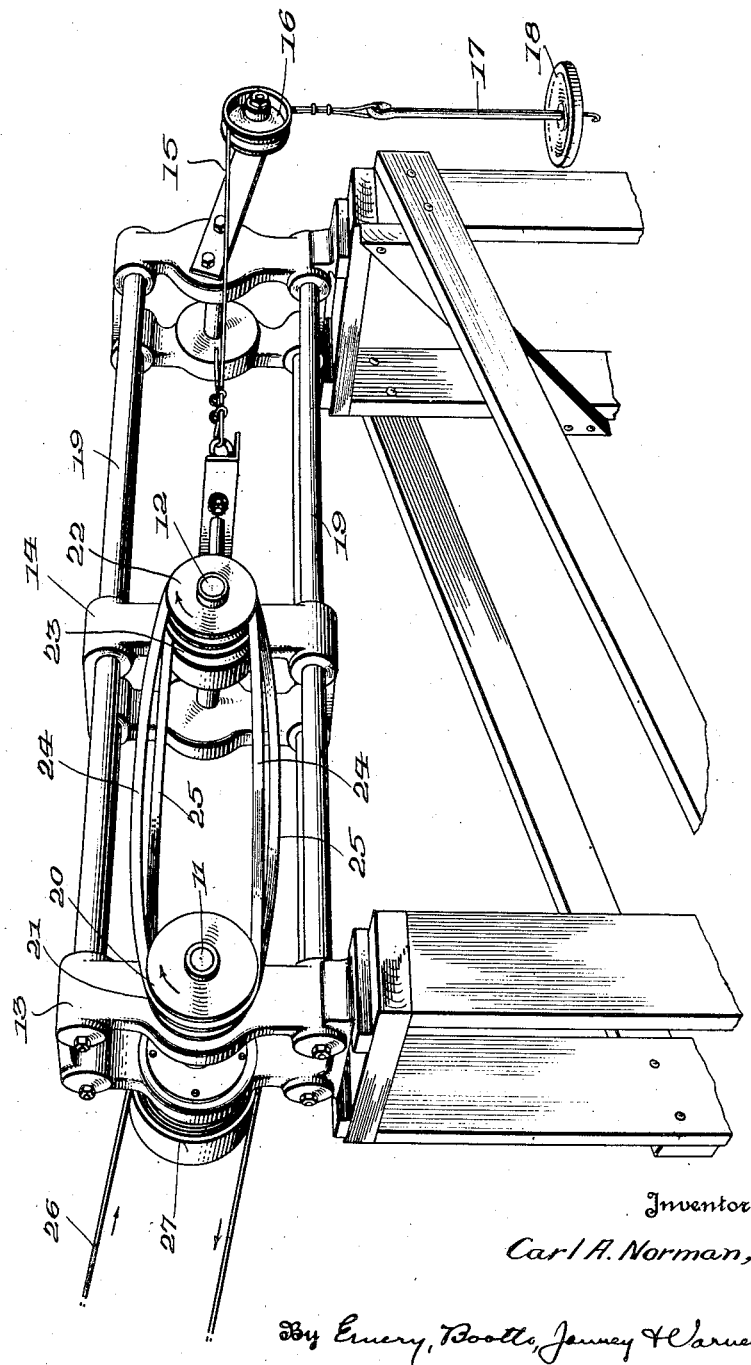
Figure 2:
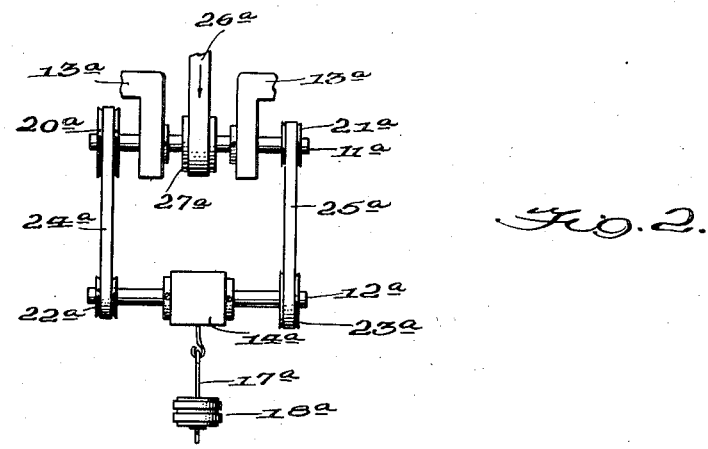
Figure 3:
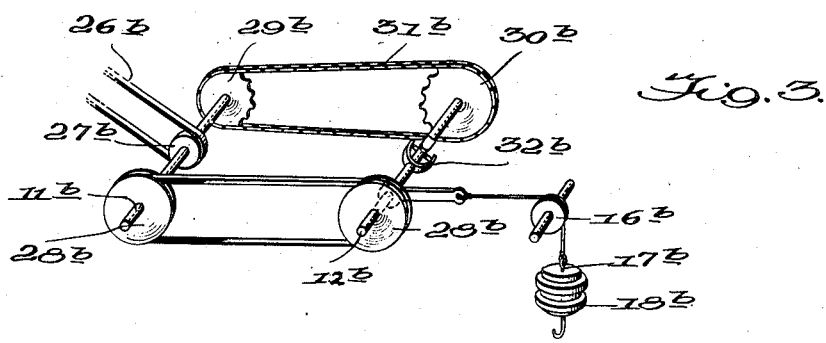
Figure 4:
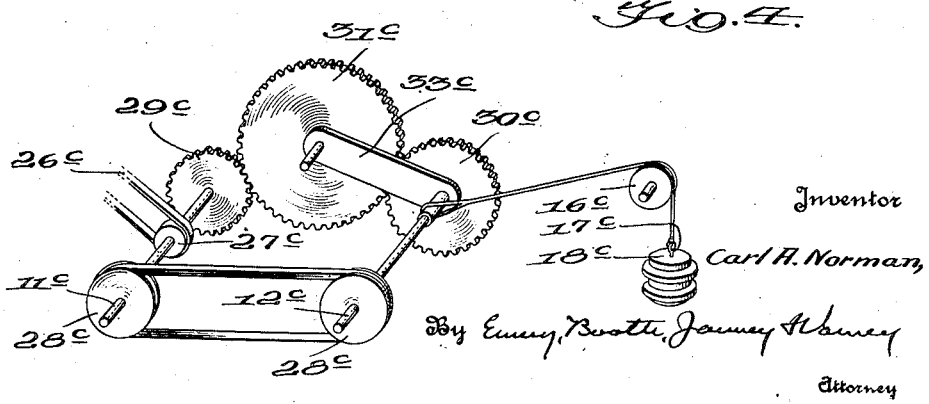

In the accompanying drawings Fig. 1 which shows in perspective a preferred embodiment of one form of belt testing machine carrying out the invention, illustrates very clearly how such a device operates when running at approximately 1000 R. P. M. under light load, the two slack strands being on opposite sides of the pulleys, and Figs. 2, 3 and 4 are diagrammatic representations of modified machines embodying my invention.

Referring to Fig. 1 of the drawings, the machine illustrated therein comprises a driving shaft 11 and a driven shaft 12. These shafts are journalled in a supporting frame shown as comprised of a stationary support 13 carrying the driving shaft 11, and a relatively movable crosshead 14 carrying the driven shaft 12. This relatively movable crosshead has connected to it means for pulling it away from the stationary member by a predetermined force. This means, as shown, comprises a wire rope or the like 15 attached to the movable member 14 and passing over a pulley 16. The free end of this rope 15 carries a weight support 17 on which are placed weights 18. In the embodiment shown the crosshead 14 is slidingly supported by guides 19.

Mounted on the driving shaft 11 are two pulleys 20 and 21, of slightly different diameters. The driven shaft 12 also has fixed thereon pulleys 22 and 23, also unequal in diameter. As shown, pulley 20 is slightly larger than pulley 21, pulley 22 is equal in size to pulley 21 and pulley 23 is equal in size to pulley 20. The pulleys are aligned so that two belts 24 and 25 may be placed, respectively, around pulleys 20 and 22 and pulleys 21 and 23. The pulleys being proportioned as above set forth, these belts will be of equal lengths. The driving shaft 11 may be driven by any suitable means. A belt drive 26 passed over a pulley 27 carried by the shaft 11 constitutes the means shown.

As shown by the arrows in the drawing, the shafts 11 and 12 are running clockwise and the belt running from the pulley 20 to the pulley 22 tends to rotate the driven shaft 12 at a speed greater than the speed of shaft 11. The belt 25 running from the smaller pulley 21 to the larger pulley 23 tends to drive the shaft 12 at a speed less than that of shaft 11. As both pulleys 22 and 23 are fixed to shaft 12, it follows that belt 24, tending to drive the shaft at greater speed and which we will call the accelerating belt, is worked against by belt 25, which we will call the decelerating belt. In other words, belt 24 is transmitting power to shaft 12, and belt 25 is returning the same power, minus the losses, to shaft 11 thus necessitating the outside supply to shaft 11 of only sufficient power to overcome the losses. As clearly shown in the drawing the upper side of belt 24 and the lower side of belt 25 run with practically no tension so that all of the tension applied by the weights 18 is divided between the tight sides of the two belts. If the pulleys 20 and 21 are of but slightly different diameter, the total tension is substantially equally divided between the tight sides of belts 24 and 25. The slip is determined by the ratio of diameters of the pulleys, and the tension in the belts is produced by dead weights pulling on the sliding cross head which carries the driven shaft. Because one side of each belt is very slack, the tension difference in each belt is nearly equal to half the total tension produced by the dead weights.

The machine thus operated consumes only the small amount of power necessary to cover the belt and bearing losses, and involves no complicated driven machinery, and at the same time reproduces all the essential conditions of a real power transmission.

By varying the slip, the pulley diameters, the speed, and the load, the life of the belt can be reduced from months and years to less than an hour. Quick indications of the effect of the various factors determining belt life may thereby be obtained.

The principle here described is, of course, not applicable merely to V-belts, but may also be applied to ropes, flat belts, and other types.

As the lineal speeds of the several pulleys are known the slip and/or creep of the two belts is readily determined, and the pulleys may be so related in size as to result in any desired percentage of slip and creep. This slip and creep, in any belting installation, results in heating of the belt. In rubber belts the temperature the belt assumes in running is a matter of supreme importance. Many investigations have been carried out in order to determine what loads, speeds, etc., may be applied to a given belt without raising the belt temperature to a serious amount. The apparatus of this invention is particularly suited for enclosure in a receptacle wherein the temperature can be artificially maintained at any degree desired, so that its effect on belt life can be determined without any disturbing factors due to variations in load, speed, etc. Thus belting can be tested for heating effect with regard to the conditions under which it may be used, as well as with regard to the excess of temperature of the belt over the surrounding temperature due to the heating caused by slip, etc.

It will be noted that with the machine disclosed, a constant tension is maintained on the belts despite the stretch of the same as shaft 12 is drawn away from shaft 11 to compensate for stretch. Thus the conditions of constant power transmission under constant lineal speed, are reproduced.

Obviously machines for carrying out the method of this invention may take other forms than that shown in Fig. 1, for example, shaft 12 might merely hang in the loops of the belt below shaft 11 and have hanging to it weights corresponding to the total load desired to be applied, thus doing away with certain supporting members where the speed, load, etc., would permit. If thus arranged, the weight of shaft 12 and its assembled elements hanging in the loops of the belts would have to be added into the total tension which is divided between the tight sides of the two belts when running. Such an arrangement is shown in Fig. 2, wherein the parts corresponding to similar parts in Fig. 1 are indicated by similar reference numerals modified by the variant letter $a$.

Moreover, as indicated diagrammatically in Figs. 3 and 4, if it is desired to obtain an absolute and positive value for the slip and tight side tension of one belt, and to determine separately the slip and creep of the belt, one of the belts can be run on two pulleys of equal diameters, as indicated as $28^b$ or $28^c$ in Figs. 3 and 4, so that the slip and creep on each pulley will be the same, and the other belt can be replaced by a positive transmission, such as a chain drive or gear drive between the two shafts to enforce a positive difference in rotative speed of the two pulleys. With such an arrangement, any means such as a universal joint in the movably mounted shaft, or an idler in the gearing, or other equivalent means can be used to allow all dead weight load to be applied to the belt being tested and to allow movement of the movably mounted shaft, as desired.

Fig. 3 shows diagrammatically an arrangement wherein equal sized pulleys $28^b$ are used, the positive drive being effected by the sprockets and chain $29^b$, $30^b$ and $31^b$, the universal joint $32^b$ providing for the application to the belt running on pulleys $28^b$ of substantially all the load $18^b$, shown applied in the same manner as the load is applied in the embodiment in Fig. 1 and allowing movement of the movably mounted shaft $12^b$ to compensate for stretch in the belt.

The use of gearing as above described may be exemplified by the diagrammatic showing of Fig. 4, wherein the belt is run between the two equal sized pulleys $28^c$, the positive drive being effected by means of stationary gears 29° and 31° and a movable gear carried by the movable shaft and held in mesh with gear 31° by a link 33°, thus providing for the application of substantially all the load 18° to the belt, and compensating for elongation of the belt by the swinging of link 33° to space shaft 12° further from shaft 11°.

Obviously the positive drive may be either the accelerating or decelerating drive, as the positive slip and creep will be enforced whether the belt is transmitting power from the power driven shaft (corresponding to 11) to the second shaft, or returning power from the second shaft to the power driven shaft.

The invention has the following advantages, viz: the time and expense of belt testing may be greatly reduced; a predetermined slip and creep may be enforced to reproduce certain working conditions and heating effects; artificial temperature conditions may be maintained throughout the test; and the belt may be tested at full power and all the power transmitted to the belt driven shaft may be returned to the belt driving shaft except what is used up in friction and other drive losses, thus necessitating supplying to the system only sufficient power to overcome the losses.

The invention is not limited to the specific embodiments of the method and apparatus illustrated herein, but I claim the following:

1. A method of testing belts, including the operation on a single shaft, of two similar belts to be tested, which comprises, operating one of said belts with slip so that it tends to accelerate the shaft, operating the other of said belts with slip so that it tends to decelerate said shaft, and utilizing the power taken off the shaft by said decelerating belt, augmented by sufficient power to supply the drive losses, to drive the accelerating belt.

2. A method of testing belts, including the operation of two belts on a set of interconnected pulleys, which comprises, operating one of said belts with slip so that it tends to accelerate the set of interconnected pulleys and operating the other of said belts with slip so that it tends to decelerate the set of interconnected pulleys, utilizing the power taken from the set of interconnected pulleys by said decelerating belt to drive the accelerating belt, and adding to the system sufficient power to supply the losses therein.

3. In a method of testing belts including the operation in a system of two power transmission means with an interconnecting power transmission means and the utilization of a belt being tested as at least one of these three power transmitting means, the steps of operating one of said power transmission means so that it tends to accelerate the interconnecting power transmission means, operating the other of said power transmission means so that it tends to decelerate the interconnecting power transmission means, transmitting the power taken from the interconnecting power transmission means by said decelerating power transmission means to drive the accelerating power transmission means of the system, and adding to the system sufficient power to supply the losses therein, thereby enforcing slip of the belt being tested and effecting economy of power in testing.

4. In belt testing, the method including running the belt on two pulleys, enforcing a difference in peripheral speeds of the two pulleys to maintain a definite percentage of slip and creep, and maintaining a substantially constant tension on the tight side of the belt.

5. In belt testing, the method including running the belt on two pulleys, enforcing a difference in peripheral speeds of the two pulleys to maintain a definite percentage of slip and creep of the belt and maintaining a substantially constant total tension on the belt.

6. In belt testing, the method which includes mechanically predetermining the tension and slip and creep for the belt to be tested, and operating the belt at any speed for any period of time up to the failure period while maintaining substantially constant the predetermined factors of the test.

7. The method of belt testing which includes supplying power to and enforcing predetermined slip of a belt to be tested, said supplied power being composed of returned transmitted power from the belt and sufficient additional power to overcome the losses in the system.

8. The method of belt testing which includes transmitting power through a slipping belt, re-utilizing the major part of the transmitted power in driving the belt, and adding to the system just sufficient power to overcome the losses therein while maintaining a substantially constant tension in the tight side of the belt and substantially no tension in the loose side thereof.

9. That improvement in belt testing which includes transmitting power through a slipping belt, re-utilizing the major part of the transmitted power in driving the belt, and adding to the system just sufficient power to overcome the losses therein while maintaining a substantially constant tension in the tight side of the belt.

10. That improvement in belt testing which includes transmitting power through a slipping belt, re-utilizing the major part of the transmitted power in driving the belt, and adding to the system just sufficient power to overcome the losses therein.

11. In a belt tester; a mechanical system partly comprised of a pair of interconnected pulleys and a pair of belts each operating on one of said pulleys and of which one slips in the direction of drive and tends to accelerate the pulleys while the other slips in the opposite direction and tends to decelerate the pulleys and at least one of which is a belt under test, said system also including means for transmitting the power taken from the interconnected pulleys by said decelerating belt to drive said accelerating belt; and means associated with said system for adding sufficient power thereto to supply the losses therein.

12. In a belt tester, a mechanical system including a shaft, a first belt tending to accelerate the shaft, a second belt tending to decelerate the shaft whereby slippage of said belts is enforced, and means for transmitting the power taken from the shaft by said decelerating belt to drive said accelerating belt, at least one of said belts being a belt under test; and means associated with said system for adding sufficient power thereto to supply the losses therein.

13. A mechanical system including an interconnecting power transmission means, two power transmission means operably connected thereto, one of said power transmission means being proportioned to accelerate said interconnecting power transmission means, and the other of said power transmission means being proportioned to decelerate said interconnecting power transmission means, means for returning the power taken from said interconnecting power transmission means by said decelerating power transmission means to drive said accelerating power transmission means, at least one of said power transmission means including a belt being tested; and means associated with said system for adding sufficient power thereto to supply the losses therein.

14. In a machine for testing belts, rotatable pulleys on which is mounted the belt to be tested, means for enforcing a difference in peripheral speeds of the pulleys during rotation to maintain a definite percentage of slip and creep of the belt, and means for maintaining a substantially constant tension on the tight side of the belt.

15. In a machine for testing belts, rotatable pulleys on which is mounted the belt to be tested, means for enforcing a difference in peripheral speeds of the pulleys during rotation to maintain a definite percentage of slip and creep of the belt and means for maintaining a substantially constant total tension on the belt.

16. In a machine for testing belts, means on which the belt is operatively mounted for testing, means for enforcing a substantially constant slip and creep of the belt throughout the test, and means for maintaining a substantially constant tension on the belt throughout the test.

17. In a machine for testing belts, means on which the belt is operatively mounted for testing, and means for enforcing a substantially constant slip and creep of the belt throughout the test.

18. In a machine for testing belts; means on which the belt to be tested is operatively mounted for transmission of power including means for passing power to be transmitted to the belt, means for taking the transmitted power from the belt, and means for enforcing slip of said belt and returning the transmitted power from said last named means less the losses in the system to the means for passing power to the belt; and means for adding sufficient power to the system to supply the losses therein.

19. A mechanical system for testing belts including means for transmitting power through the belt to be tested, and means for enforcing slip of said belt and returning and re-utilizing the major part of the transmitted power to drive the belt; and means associated with said system for adding sufficient power thereto to supply the losses therein.

In testimony whereof, I have signed my name to this specification.

CARL A. NORMAN.